United States Patent [19]

Lameris

[11] 4,121,352
[45] Oct. 24, 1978

[54] APPARATUS FOR DRYING AND DEGASSING OIL

[75] Inventor: Jan Warmolt Lameris, Nootdorp, Netherlands

[73] Assignee: N.K.F. Kabel B.V., Netherlands

[21] Appl. No.: 777,407

[22] Filed: Mar. 14, 1977

[30] Foreign Application Priority Data

Mar. 8, 1976 [NL] Netherlands ..................... 7602387

[51] Int. Cl.² ............................................. F26B 13/30
[52] U.S. Cl. ............................................. 34/92; 159/3
[58] Field of Search ........... 34/92; 159/3, 4, DIG. 32, 159/DIG. 33

[56] References Cited

U.S. PATENT DOCUMENTS 3,273,629 9/1966 Sargeant ..................... 159/3

Primary Examiner—John J. Camby
Attorney, Agent, or Firm—Frank R. Trifari; David R. Treacy

[57] ABSTRACT

An apparatus for drying and degassing oil, comprising a treatment tank; an oil circulation circuit including a pumping set, heating means, and spraying means; and a vacuum pump for bringing the oil in the tank under partial vacuum. The pumping set is arranged entirely within the treatment tank and is immersed in the oil. A spring-loaded mass of distributing elements is arranged in a distribution space opposite the spraying means.

6 Claims, 2 Drawing Figures

APPARATUS FOR DRYING AND DEGASSING OIL

BACKGROUND OF THE INVENTION

The invention relates to an apparatus for drying and degassing oil, notably cable oil, used in oil-filled electric cables and more particularly to such apparatus comprising an airtight treatment tank having an inlet and an outlet, a vacuum pump for creating a partial vacuum in the tank, a circulation circuit which includes a pumping set for circulating the oil through the tank, heating means for heating the oil, and spraying means for increasing the surface area of the oil in the tank.

SUMMARY OF THE INVENTION

An object of the invention is to provide an apparatus of this kind whereby drying and degassing of oil can be realized to a greater extent than by the known versions, so that this oil becomes a substantially ideal insulating oil; the invention also aims to achieve this result at comparatively low costs, at the same time that the apparatus should also be suitable for the treatment of small quantities of oil.

Another object of the invention is to this end, in accordance with the invention the pumping set is arranged within the treatment tank. This eliminates the drawback of externally disposed pumps where, due to the vacuum, ingress of air and hence of moisture is possible through porous pump housings, seals and shaft seals, so that the treatment of degassed and dried oil is nullified. Also less rigorous maintenance of the sealing of moving parts is required. The use of an electric motor which is arranged in the treatment tank and which is immersed in the oil is particularly effective as a result of the insulating properties of this oil.

The resulting reliability in the operation of the apparatus and the treatment carried out thereby makes the apparatus very suitable for construction as a mobile unit which can be employed in various places and also for the treatment of small quantities of oil.

According to the invention oil distributing means are provided comprising a mass of distributing elements like rings or tubes, for example, of pyrex glass contained in a distribution space inside the treatment tank. As a result, a fine distribution of the sprayed oil over a large surface area is obtained, so that intensive drying and degassing is carried out under vacuum and at a raised temperature.

In view of the mobility of the apparatus the distributing means are held in a compact mass by one or more spring-loaded pressure members, for example, in the form of a perforated plate, a grid or a gauze.

In order to raise the temperature of the oil to be treated, the distribution space in which the distributing means are disposed is preferably surrounded by a wall which is heated in order to radiate heat into the distribution space. This radiated heat can readily reach the oil which is finely distributed over the distributing means.

Said wall is preferably surrounded by an annular chamber containing a heating liquid such as oil and heating elements, the circulation circuit passing through said chamber.

In an embodiment of the invention suitable for use anywhere in the world, the apparatus includes a water monitor in the inlet duct for detecting the presence of "free" (not dissolved) water in the oil and to control an inlet valve, for example, an electromagnetic valve. The water monitor can comprise a device which measures the electrical resistance of the oil and which is adjusted not to react to moist oil that is, oil with water dissolved therein.

In order to prevent operating errors, in accordance with the invention there may be provided a combination of three valves, for example, of the electromagnetic type, which are included in the inlet duct, the outlet duct and an interconnecting duct of the circulation circuit, respectively said valves being actuated by common control means so that the valves in the inlet and outlet ducts are open when the valve in the interconnecting duct is closed and vice versa.

The apparatus can also be provided with measuring and monitoring means which react to oil pressure, oil level and temperature.

The invention will be described in detail hereinafter with reference to the accompanying diagrammatic drawing.

DESCRIPTION OF THE PREFERRED EMBODIMENT

Figure 2:
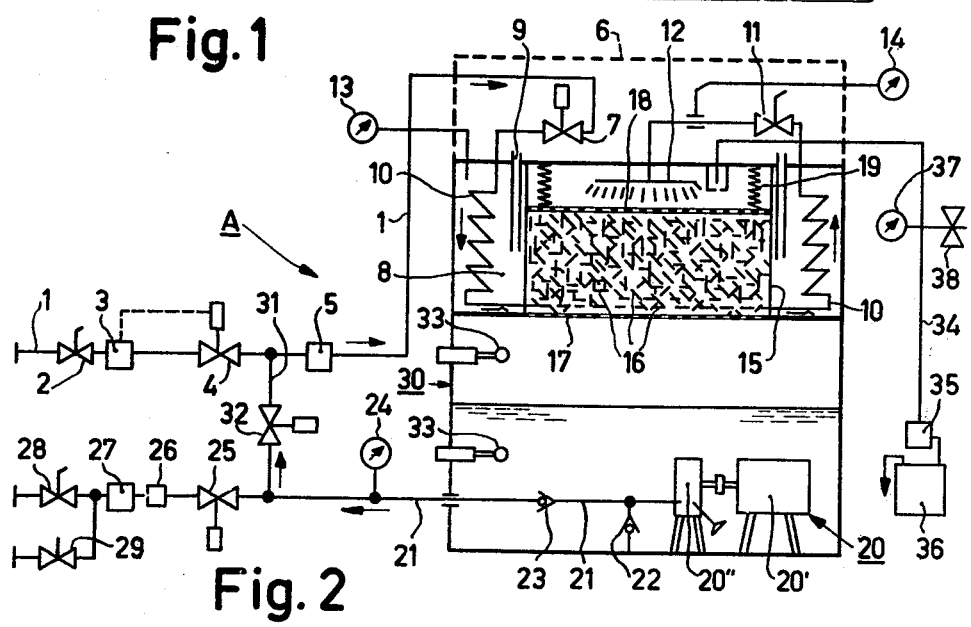
FIG. 2 is a diagrammatic representation of the apparatus of FIG. 1.

The apparatus A shown in FIG. 2 comprises an inlet duct 1, an inlet valve 2, a water monitoring unit 3, and electromagnetically operated valve 4 which is controlled by the unit 3, and an oil filter 5 which comprises a replaceable filter element having pores of, for example, 0.001 mm. The unit 3 serves to detect the pressure of "free" water not dissolved in the oil and causes the valve 4 to close in the event of such water being present in the oil. Beneath a cover 6, denoted by broken lines, the inlet duct 1 enters, through an electromagnetically operated valve 7, an annular chamber 8 in a treatment tank which is denoted generally by the reference numeral 30. The chamber 8 contains heating oil which is heated by a number of electrical heating elements 9. The duct 1 continues through the chamber 8 in the form of coiled pipe 10, diagrammatically shown as a zig-zag line, through a control valve 11, and terminates outside the chamber 8 in a spraying device 12. A contact thermometer 13 monitors the temperature of the heating oil in the chamber 8, and a contact thermometer 14 monitors the temperature of the oil to be treated. The spraying device 12 sprays the oil to be treated into a distribution space 15 which is filled with a mass of small tubes 16 made of Pyrex glass. The tubes are shown diagrammatically by short lines in FIG. 2. On the wall surrounding the distribution space 15 drip strips (not shown) can be used which leave enough clearance for the radiation of heat from the wall.

The Pyrex tubes 16 are held in a compact mass between a fixed lower perforated plate 17 and a movable upper plate 18 which is loaded by springs 19, so that the tubes 16 remain unaffected by the position and movements of the apparatus.

A pumping set 20, consisting of an electric motor 20' and a pump 20'', is mounted on the bottom of the treatment tank 30, so that it is immersed in the oil which collects in the bottom region of the tank. The pump 20'' has connected to it an outlet duct 21 to which is connected a pressure relief valve 22 and in which a non-return valve 23 is incorporated.

Outside the treatment tank 30 the outlet duct 21 has connected to it an oil pressure gauge 24. The duct 21 extends through an electromagnetically operated valve 25, a filter 26 and an oil flow meter 27, to an outlet valve 28, and a branch extends from the duct 21 to a circulation pumping valve 29.

Between the inlet duct 1 and the outlet duct 21 there is provided an interconnecting duct 31 which incorporates an electromagnetically operated valve 32. When the valves 4 and 25 are closed, the valve 32 is open, and vice versa; for this purpose the three valves can be controlled in combination by a single switch (not shown). When the valve 32 is open, the interconnecting duct 31 completes a circulation circuit which is further formed by the duct portions 1 and 10, the spraying device 12, the distribution space 15, the lower part of the treatment tank 30, the pumping set 20 and the duct 21.

The reference numeral 33 denotes a pair of float operated switches which serve to monitor the maximum and the minimum oil level in the tank 30.

A duct 34 connects a vacuum pump 35, having a condensate trap 36, to the distribution space 15. The duct 34 has connected to it a vacuum gauge 37 and a valve 38.

Figure 1:
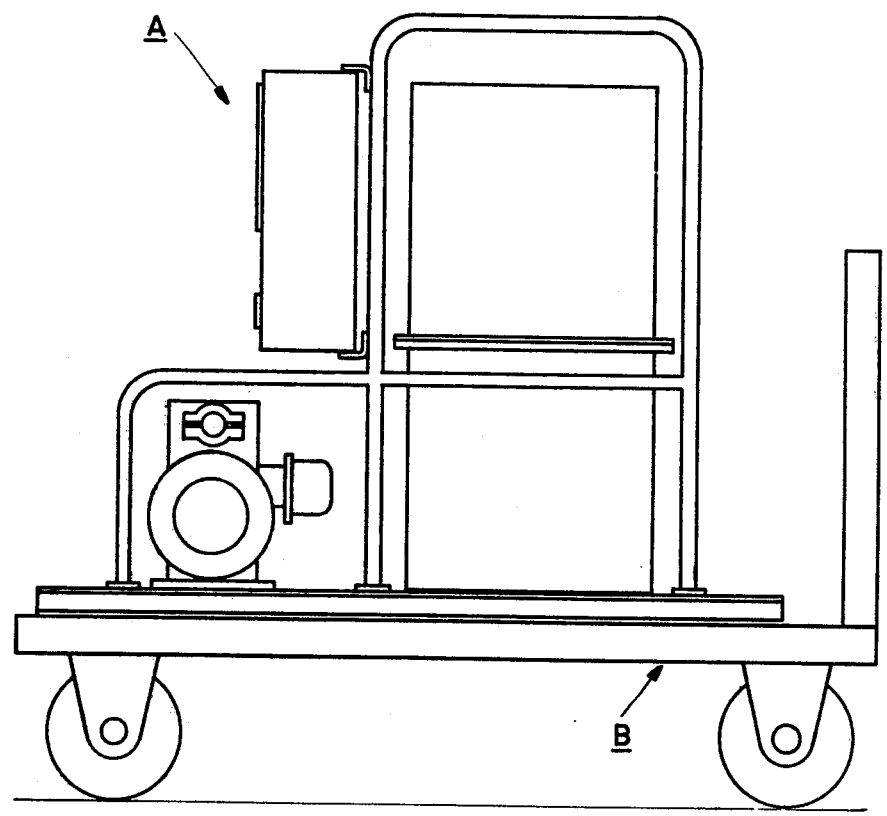
FIG. 1 shows a side elevation of an apparatus in accordance with the invention which is constructed as a mobile unit.

In FIG. 1 the apparatus A, comprising all the parts shown in the diagram of FIG. 2, is arranged on a wheeled carriage B which is only diagrammatically shown and which may belong, for example, to the loading space of a freight van or a trailer.

Substantially all parts which come into contact with the oil to be treated are made of stainless steel.

What is claimed is:

1. Apparatus for drying and degassing oil, notably cable oil used in oil-filled electric cables, comprising an airtight treatment tank having a bottom region, an inlet, and an outlet extending from said bottom region, a vacuum pump connected to the tank for creating a partial vacuum in the tank, and a circulation circuit for treating oil which includes a pumping means for circulating oil from said bottom region through the tank, heating means for heating the circulating oil, and spraying means for increasing the surface area of the oil circulated by the pumping means in the treatment tank, wherein the apparatus includes means for maintaining a level of oil in said lower region above a given level; and said pumping means comprises a pump and a motor connected to the pump, disposed in said lower region below said given level, whereby said pump and motor are immersed in the oil.

2. Apparatus as claimed in claim 1, comprising a mass of distributing elements contained in a distribution space inside the treatment tank, and arranged so that oil sprayed by said spraying means flows through said mass.

3. Apparatus as claimed in claim 2, comprising means for additionally including means for holding said distributing elements in a compact mass, said holding means comprising one or more spring-loaded pressure members.

4. Apparatus as claimed in claim 2 including a wall within said tank and surrounding the distribution space, and means for heating the wall in order to radiate heat into the distribution space.

5. Apparatus as claimed in claim 4, comprising an annular chamber surrounding said wall and containing a heating liquid and heating elements, said circulation circuit passing through said chamber.

6. Apparatus as claimed in claim 1 comprising a water monitor in the inlet duct, and means for preventing flow of undissolved water through said inlet duct into the tank.

* * * * *